United States Patent
Zhou et al.

(10) Patent No.: US 12,435,886 B2
(45) Date of Patent: Oct. 7, 2025

(54) AIR-CONDITIONING SYSTEM AND CONTAINER

(71) Applicant: Shenzhen Envicool Technology Co., Ltd., Shenzhen (CN)

(72) Inventors: Wenbing Zhou, Shenzhen (CN); Baohui Shui, Shenzhen (CN)

(73) Assignee: Shenzhen Envicool Technology Co., Ltd., Shenzhen (CN)

( * ) Notice: Subject to any disclaimer, the term of this patent is extended or adjusted under 35 U.S.C. 154(b) by 199 days.

(21) Appl. No.: 18/061,483

(22) Filed: Dec. 5, 2022

(65) Prior Publication Data

US 2023/0250975 A1   Aug. 10, 2023

(30) Foreign Application Priority Data

Feb. 10, 2022 (CN) .......................... 202220274149.9

(51) Int. Cl.
*F24F 1/56* (2011.01)

(52) U.S. Cl.
CPC ...................... *F24F 1/56* (2013.01)

(58) Field of Classification Search
CPC ...... F24F 1/56; F24F 1/022; F24F 1/02; F24F 1/029; F24F 1/0323; F24F 13/28; F24F 2013/205; F24F 2221/36; F24F 13/20; Y02E 60/10
See application file for complete search history.

(56) References Cited

U.S. PATENT DOCUMENTS

2016/0033146 A1* 2/2016 Jinnai ...................... F24F 1/16
                                                          417/423.15

FOREIGN PATENT DOCUMENTS

| CN | 110939991 A | * | 3/2020 | |
| JP | 2010261622 A | * | 11/2010 | |
| WO | WO-02077535 A1 | * | 10/2002 | .............. F24F 1/022 |

* cited by examiner

*Primary Examiner* — Ana M Vazquez
(74) *Attorney, Agent, or Firm* — Andrew C. Cheng

(57) ABSTRACT

An air-conditioning, system includes a cabinet with a partition dividing an internal space of the cabinet into an indoor compartment and an outdoor compartment. An evaporator, a compressor and an internal fan are disposed in the indoor compartment. A condenser and an external fan are disposed in the outdoor compartment. The cabinet is provided with an internal air inlet corresponding to the internal fan, an internal air outlet corresponding to the evaporator, an external air inlet corresponding to the external fan, and an external air outlet corresponding to the condenser. The air-conditioning system is of a cabinet structure as a whole, has a small size and occupies a small space. An air flow of the internal fan is completely separated from an air flow of the external fan, so that internal circulating air and external circulating air are effectively prevented from being mixed, and the refrigerating effect is improved.

20 Claims, 10 Drawing Sheets

AIR-CONDITIONING SYSTEM AND CONTAINER

TECHNICAL FIELD

The invention relates to the technical field of air-conditioning equipment, in particular to an air-conditioning system for containers.

BACKGROUND

With the development of the energy storage industry, large containerized energy storage batteries are being used more and more widely for centralized power backup and generation. Generally, air-conditioning systems are provided in containers to ventilate and cool batteries so as to avoid heat accumulation to ensure safe operation of the batteries.

There are two types of existing air-conditioning systems used for containers: civil cabinet air conditioners and central air-conditioning systems. The civil cabinet air conditioners have a limited refrigerating capacity, and cannot meet the higher and higher cooling requirements of the containers. The central air-conditioning systems have a higher refrigerating capacity, but an air duct has to be arranged at the top of the containers to receive air from the central air-conditioning systems via a top air outlet and then deliver the air into a battery cabinet to cool batteries in the battery cabinet. The air duct occupies a certain height space of the containers and is not conducive to the storage of the batteries. So, further improvements on the existing air-conditioning systems for containers is needed.

SUMMARY

It is desired to provide an air-conditioning system which occupies a small space and has a good refrigerating effect, as well as a container using the air-conditioning system.

In one aspect, the present invention provides an air-conditioning system configured to be mounted in a container. The air-conditioning system comprises a cabinet comprising an internal space and a partition disposed in the cabinet to divide the internal space into an indoor compartment and an outdoor compartment; an evaporator, a compressor and at least one internal fan disposed in the indoor compartment; and a condenser and an external fan disposed in the outdoor compartment, the evaporator, the compressor and the condenser cooperatively forming a refrigerant circulation loop. The cabinet is provided with an internal air inlet in a position corresponding to the internal fan, an internal air outlet in a position corresponding to the evaporator, an external air inlet in a position corresponding to the external fan, and an external air outlet in a position corresponding to the condenser.

In some embodiments, the external air outlet and the external air inlet are formed in a same side of the cabinet.

In some embodiments, the external air outlet and the external air inlet are arranged one above the other in a vertical direction; and the condenser and the external fan are arranged one above the other in the vertical direction.

In some embodiments, the external air outlet is located above the external air inlet and the evaporator is located above the external fan.

In some embodiments, the internal air inlet and the internal air outlet are formed in two adjacent sides of the cabinet respectively, and the internal fan and the evaporator are arranged abreast in the indoor compartment.

In some embodiments, the compressor is located below the internal fan.

In some embodiments, an electrical control box is disposed in the indoor compartment, the electrical control box is located below the internal fan, and the electrical control box and the compressor are arranged abreast.

In some embodiments, the electrical control box is closer to a side, formed with the internal air inlet, of the cabinet than the compressor.

In some embodiments, a first air guide member is disposed between the internal fan and a side plate, formed with the internal air inlet, of the cabinet, and is provided with an air guide port communicated with the internal air inlet and the internal fan.

In some embodiments, a beam is disposed in the indoor compartment, and the internal fan is hung on the beam through a stand.

In some embodiments, a second air guide member is disposed between the external fan and a side plate, formed with the external air inlet, of the cabinet, and is provided with an air guide port communicated with the external air outlet and the external fan.

In some embodiments, a mounting bracket is disposed in the outdoor compartment, and the external fan is slidably mounted to the mounting bracket through a stand.

In some embodiments, a filter screen is disposed between the second air guide member and the cabinet.

In some embodiments, a filter screen is disposed between the first air guide member and the cabinet.

In some embodiments, the cabinet comprises a first side plate and a second side plate that are opposite to each other, and a third side plate and a fourth side plate that are opposite to each other; the partition is parallel to and spaced apart from the first side plate and the second side plate; an angle is formed between the evaporator and the partition.

In some embodiments, the external air outlet is formed in the first side plate; the internal air inlet is formed in the third side plate; and the internal air outlet is located in an edge, close to the fourth side plate, of the second side plate.

In some embodiments, the external air outlet is formed in the first side plate; the internal air inlet is formed in the fourth side plate; and the internal air outlet is located in an edge, close to the third side plate, of the second side plate.

In another aspect, the present invention provides a container which comprises a case defining a first direction and a second direction inclined to the first direction; two rows of shelves disposed in the case and spaced from each other in the second direction; and at least two air-conditioning systems described above. The two air-conditioning system are located at a same end of the container in the first direction, a first air passage extending along the first direction is formed between the two rows of shelves, second air passages are formed between the two rows of shelves and the case, the first air passage is communicated with the internal air outlets of the two air-conditioning systems so that cooled air discharged from the air-conditioning systems is capable of flowing into the first air passage, and the second air passages are communicated with the internal air inlets of the two air-conditioning systems so that heated air is capable of flowing back to the air-conditioning systems along the second air passages.

In some embodiments, the cooled air discharged from the air-conditioning systems is capable of flowing through the shelves in the second direction from the first air passage and exchanging heat with thermogenic goods disposed on the shelves to be turned into the heated air; the heated air is capable of flowing back to the air-conditioning systems along the second air passages under action of the internal fans and exchanging heat with the evaporators; and outdoor air located outside the case is capable of entering into the outdoor compartment under action of the external fans and exchanging heat with the condensers.

In some embodiments, the case comprises two sidewalk extending in the first direction; the second air passages are formed between the two rows of shelves and the two sidewalls of the case respectively; the internal air inlets of the two systems face the two sidewalk respectively; the internal air outlets of the two systems orientate to the first air passage; and the external air inlets and the external air outlets of the two systems face an outdoor space outside the case in the first direction.

Compared with the prior art, the embodiments of the invention have at least the following technical effects:

The air-conditioning system as the whole is a cabinet structure, and an internal air inlet and an internal air outlet are formed in two sides of an indoor compartment respectively, so that an extra air supply duct of a central air-conditioning system is not needed, and the space occupied by the air-conditioning system is reduced. In addition, the partition is disposed in the cabinet of the air-conditioning system, so that the air flow of an internal fan is completely separated from the air flow of an external fan, internal circulating air and external circulating air are effectively prevented from being mixed, and the refrigerating effect is improved.

The container provided by the embodiments of the invention uses the air-conditioning systems mentioned above, the space between shelves is used as an air supply passage of the container, and spaces between the shelves and the case are used as air return passages of the container, so that air from the air-conditioning systems is directly blown to the two rows of shelves, no extra air duct occupying a height space of the container is needed. The refrigerating effect is improved.

DETAILED DESCRIPTION OF THE INVENTION

Figure 1:
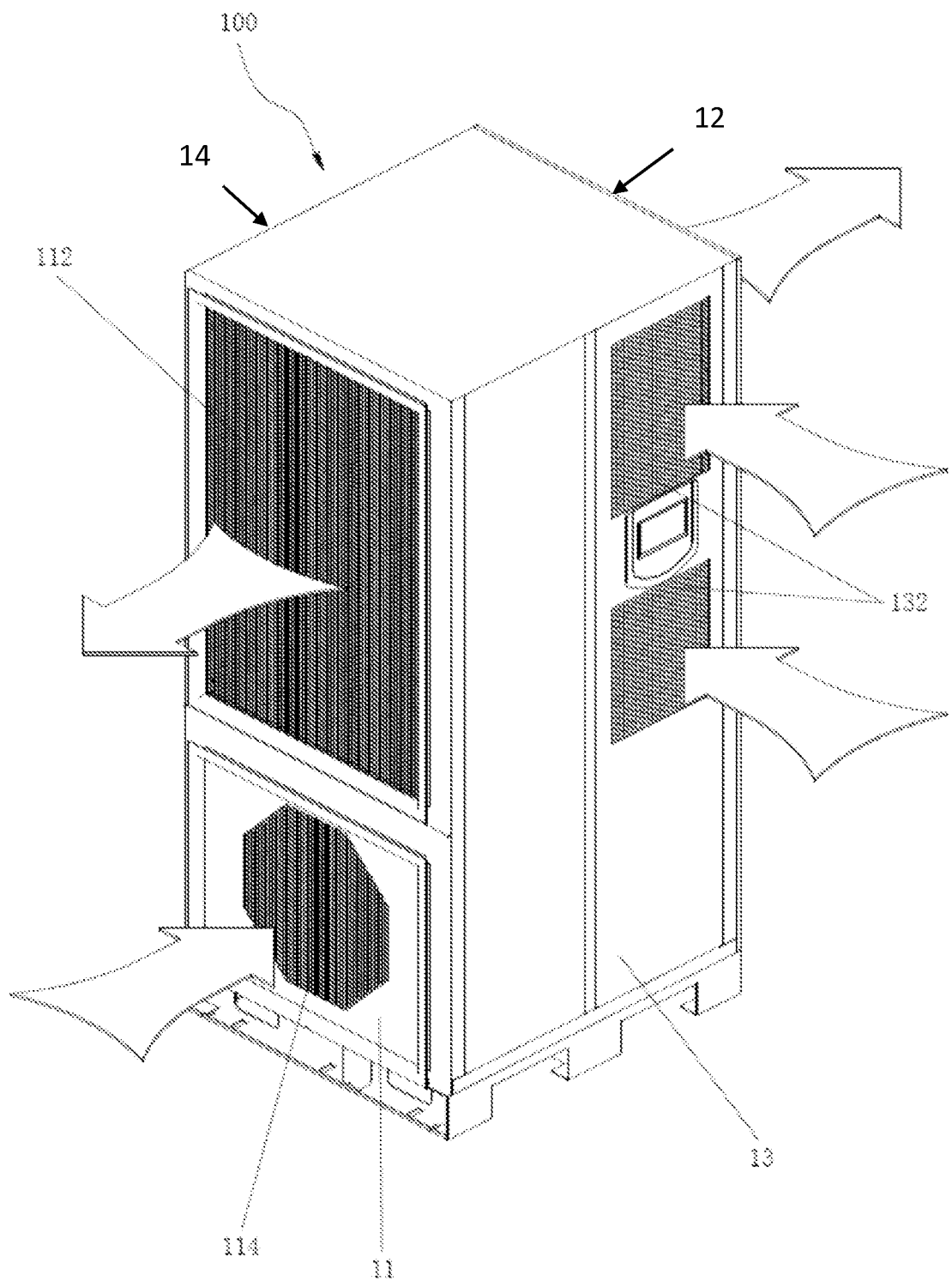
FIG. 1 is a schematic view of an air-conditioning system according to an embodiment of the invention.
Figure 2:
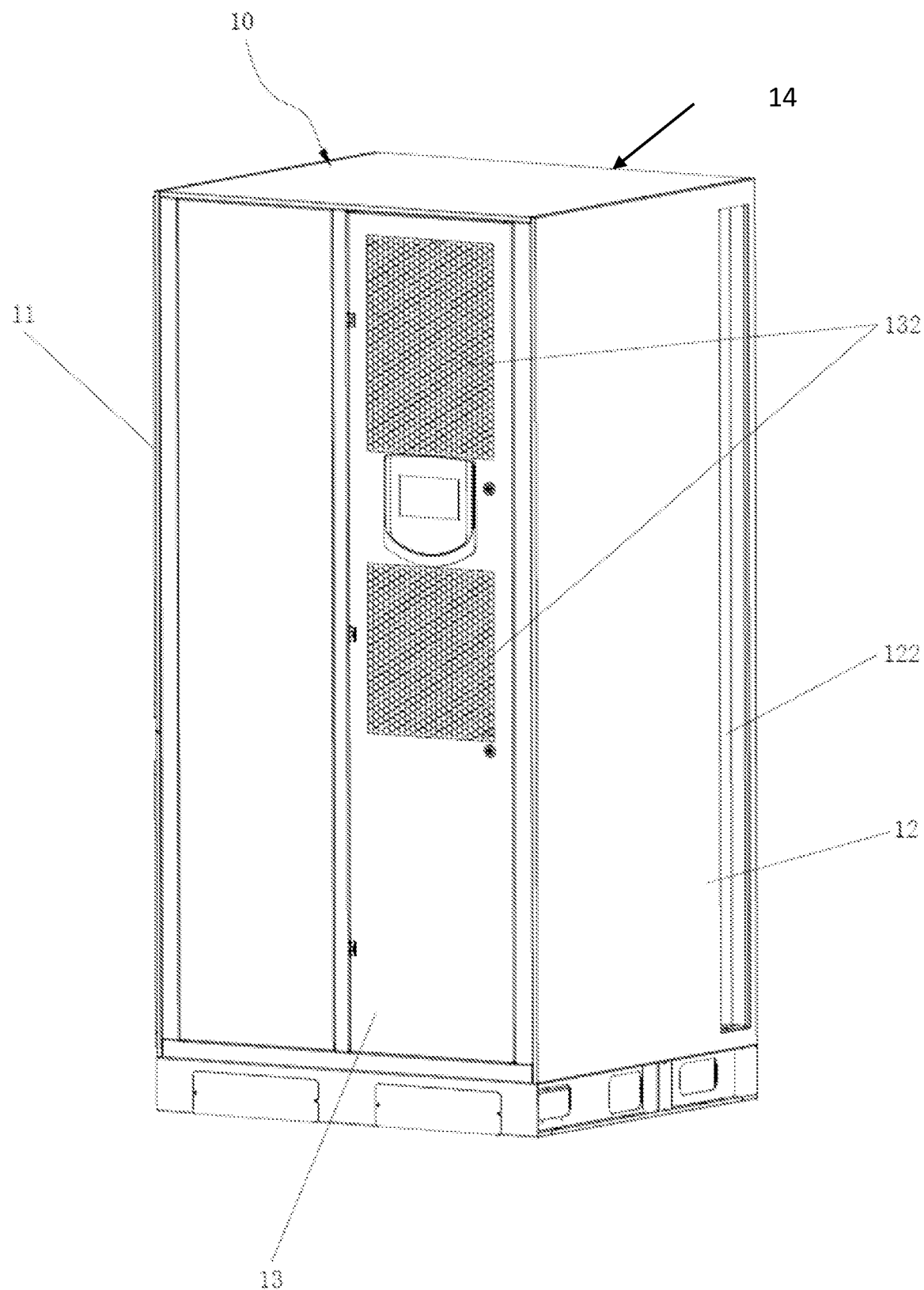
FIG. 2 is a view from another perspective of the air-conditioning system shown in FIG. 1.

To gain a good understanding of the invention, the invention will be described more comprehensively below with reference to the accompanying drawings. One or multiple embodiments of the invention are illustratively shown in the drawings, so that the technical solutions disclosed by the invention can be understood more accurately and thoroughly. It should be understood that the invention may be implemented in different forms and is not limited to the embodiments described below.

In the drawings of the invention, identical or similar reference numbers correspond to identical or similar components. It should be understood that, in the description of the invention, terms such as "upper", "lower", "left" and "right" are used to indicate directional or positional relations based on the accompanying drawings merely for the purpose of facilitating and simplifying the description of the invention, and do not indicate or imply that a device or element referred to must have a specific direction or be configured and operated in a specific direction, so the terms for describing positional relations in the accompanying drawings are merely used for illustrative descriptions, and should not be construed as limitations of this patent. Those ordinarily skilled in the art may understand the specific meanings of these terms as the case may be.

Figure 6:
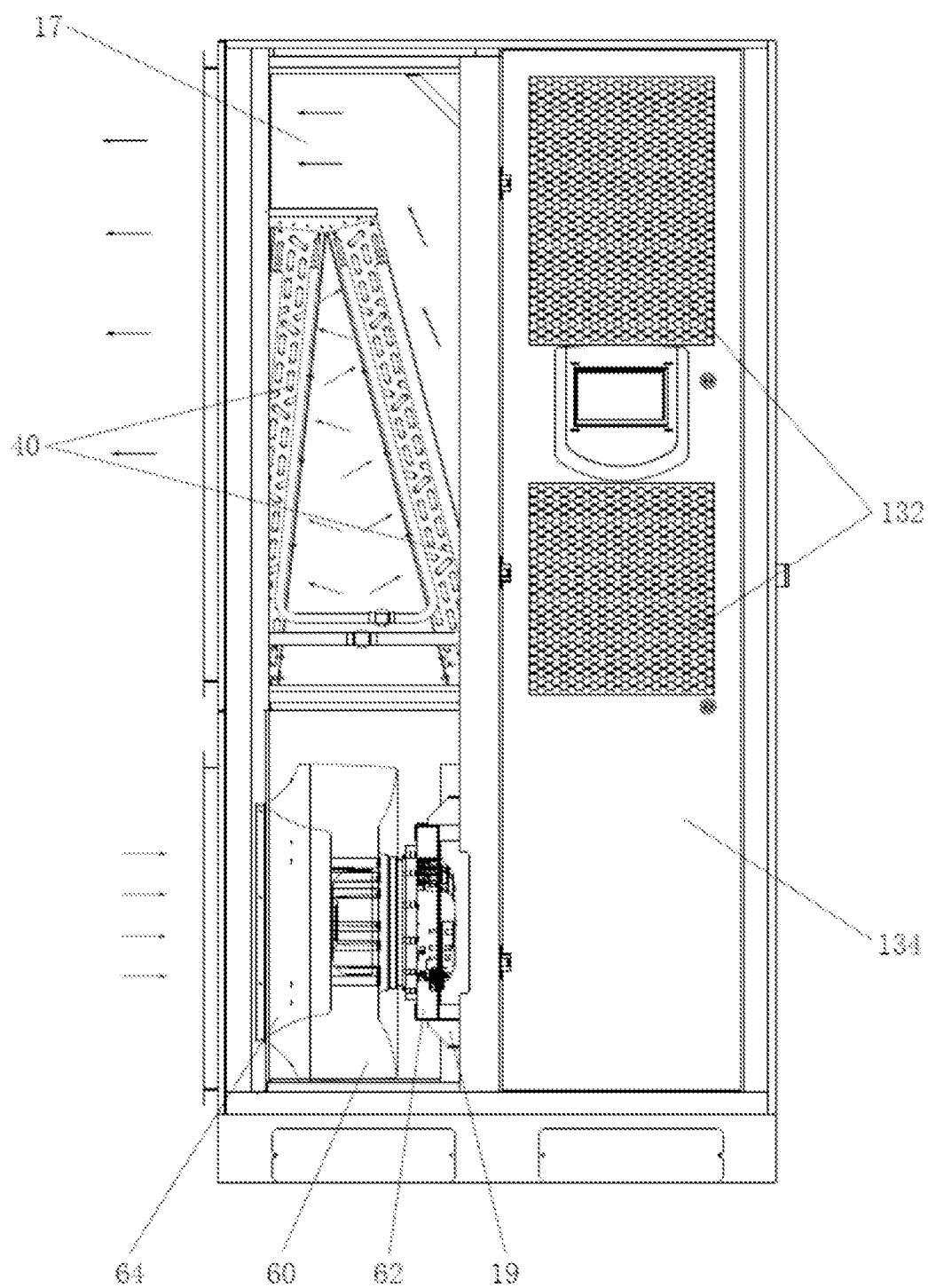
FIG. 6 is a schematic diagram of external air circulation of the air-conditioning system shown in FIG. 1.
Figure 7:
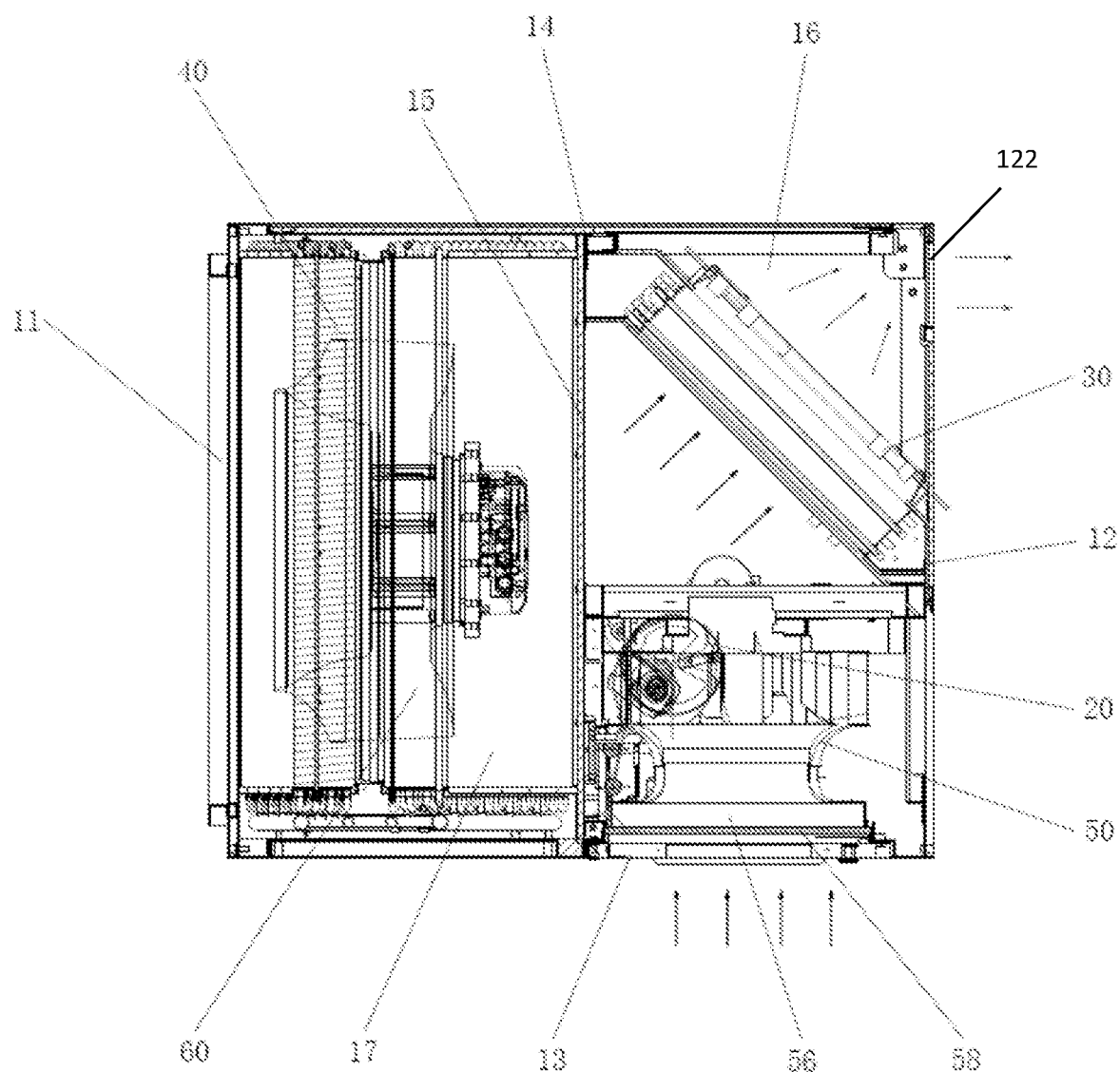
FIG. 7 is a schematic diagram of internal air circulation of the air-conditioning system shown in FIG. 1.
Figure 8:
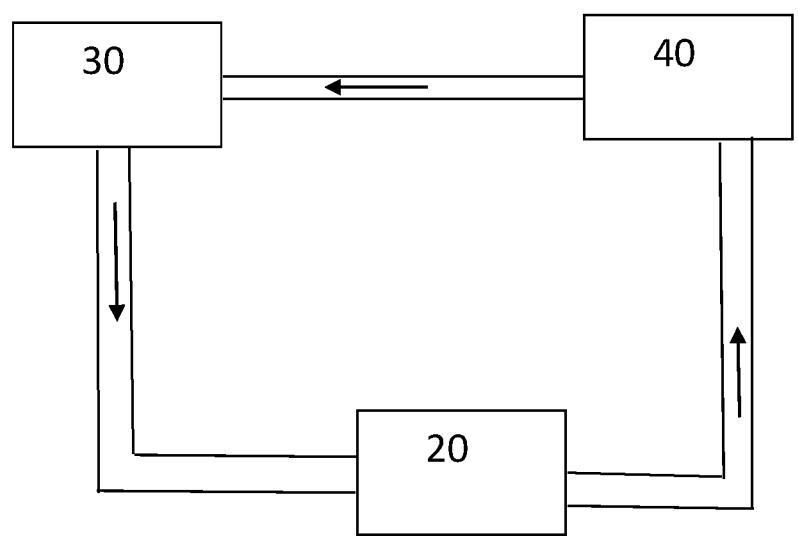
FIG. 8 illustrates a refrigerant circulation loop formed among an evaporator, a compressor and a condenser of the air-conditioning system.

The present invention provides an air-conditioning, system, which is preferably applied in a container to ventilate and cool thermogenic goods, such as batteries and food, stored in the container. FIG. 1-FIG. 8 illustrate an air-conditioning system 100 in accordance with an embodiment of the invention. The air-conditioning system 100 is of a cabinet structure, and comprises a cabinet 10, and a compressor 20, an evaporator 30, a condenser 40, internal fans 50 and an external fan 60 disposed in the cabinet 10. The compressor 20, the evaporator 30 and the condenser 40 are connected through pipes and valves to form a refrigerant circulation loop as shown in FIG. 8. When the air-conditioning system 100 is in operation, a refrigerant in the refrigerant circulation loop absorbs heat to be evaporated into low-temperature and low-pressure steam when flowing through the evaporator 30, the low-temperature and low-pressure steam is compressed by the compressor 20 to turn into high-temperature and high-pressure steam, the high-temperature and high-pressure steam releases heat to be condensed into liquid when flowing through the condenser 40, the liquid returns into the evaporator 30 after being throttled. Thus, one refrigeration cycle is completed. Heat of an indoor space can be transferred to the evaporator 30 and discharged to an outdoor space by the condenser 40.

The cabinet 10 comprises a top plate and a bottom plate that are opposite to each other in a vertical direction, and multiple side plates connected between the top plate and the bottom plate, such as a first side plate 11 and a second side plate 12 that are opposite to each other in a front-back direction and a third side plate 13 and a fourth side plate 14 that are opposite to each other in a left-right direction. A partition 15 (shown in FIG. 7) is disposed in the cabinet 10. The partition 15 is parallel to and spaced apart from the first side plate 11 and the second side plate 12. The partition 15 divides an internal space of the cabinet 10 into an indoor compartment 16 and an outdoor compartment 17. The outdoor compartment 17 is located between the first side plate 11 and the partition 15, and the indoor compartment 16 is located between the partition 15 and the second side plate 12. In this embodiment, the condenser 40 and the external fan 60 are disposed in the outdoor compartment 17, and the condenser 40 is preferably disposed above the external fan 60 as shown in FIG. 6. Preferably, the external fan 60 is a centrifugal fan. The condenser 40 has a V-shaped configuration with an opening orientated to the discharge side of the external fan 60. The compressor 20, the evaporator 30 and the internal fans 50 are disposed in the indoor compartment 16. The internal fans 50 and the compressor 20 are arranged along the vertical direction and are close to the third side plate 13, and the evaporator 30 is close to the fourth side plate 14. Preferably, the partition 15 is provided with electrical ports and/or pipe ports to facilitate the connection and assembly of components.

The third side plate 13 is provided with internal air inlets 132 that exactly face the internal fans 50. In this embodiment, two internal fans 50 are provided and thus two internal air inlets 132 respectively corresponding to the two internal fans 50 are formed in the third side plate 13. Each internal air inlet 132 comprises a plurality of ventilation holes. The second side plate 12 is provided with an internal air outlet 122 that exactly faces the evaporator 30. The first side plate 11 is provided with an external air outlet 112 and an external air inlet 114 arranged one above the other, the external air inlet 114 exactly faces the external fan 60, and the external air outlet 112 exactly faces the condenser 40. Preferably, the external air outlet 112 and the external air inlet 114 each comprises a plurality of ventilation holes oriented in the same orientation directions. When the air-conditioning system 100 is in operation, the first side plate 11 provided with the external air inlet 114 and the external air outlet 112 faces outdoors and is communicated with an external space/environment, and the third side plate 13 provided with the internal air inlets 132 and the second side plate 12 provided with the internal air outlet 122 face indoors and are communicated with an indoor space. The internal fans 50 are configured to generate a negative pressure to force indoor heated/hot air in the indoor space to enter the indoor compartment 16 via the internal air inlets 132 and flow through the evaporator 30. The indoor heated/hot air exchanges heat with the evaporator 30 when flowing through the evaporator 30. The external fan 60 is configured to generate a negative pressure to force outdoor cool/cold air to enter the outdoor compartment 17 via the external air inlet 114 and to flow through the condenser 40. The outdoor cool/cold air exchanges heat with the condenser 40 when flowing through the condenser 40. Thus, heat in the indoor space is transferred to the evaporator 30 and discharged to the outdoor space by the condenser 40.

Specifically, as shown in FIG. 6, under the action of the internal fans 50, indoor heated/hot air enters the indoor compartment 16 via the internal air inlets 132 and flows to the evaporator 30. When the indoor heated/hot air flows through the evaporator 30, heat in the indoor heated/hot air is absorbed by the refrigerant, so that the indoor heated/hot air is cooled and turned into cool air which flows to the indoor space via the internal air outlet 122; meanwhile, as shown in FIG. 7, under the action of the external fan 60, outdoor cool/cold air enters the outdoor compartment 17 via the external air inlet 114 and flows to the condenser 40. When flowing through the condenser 40, the outdoor cool/cold air absorbs heat released by the refrigerant to be heated into heated/hot air which flows to the outdoor space via the external air outlet 112. In this way, heat in the indoor space is transferred by the refrigerant from the evaporator 30 to the condenser 40 and is finally discharged to the outdoor space. The air flow of the internal fans 50 in the indoor compartment 16 is completely separated from the air flow of the external fan 60 in the outdoor compartment 17 by the partition 15, so that internal circulating air and external circulating air in the cabinet 10 are effectively prevented from being mixed and the refrigerating effect is improved.

Figure 3:
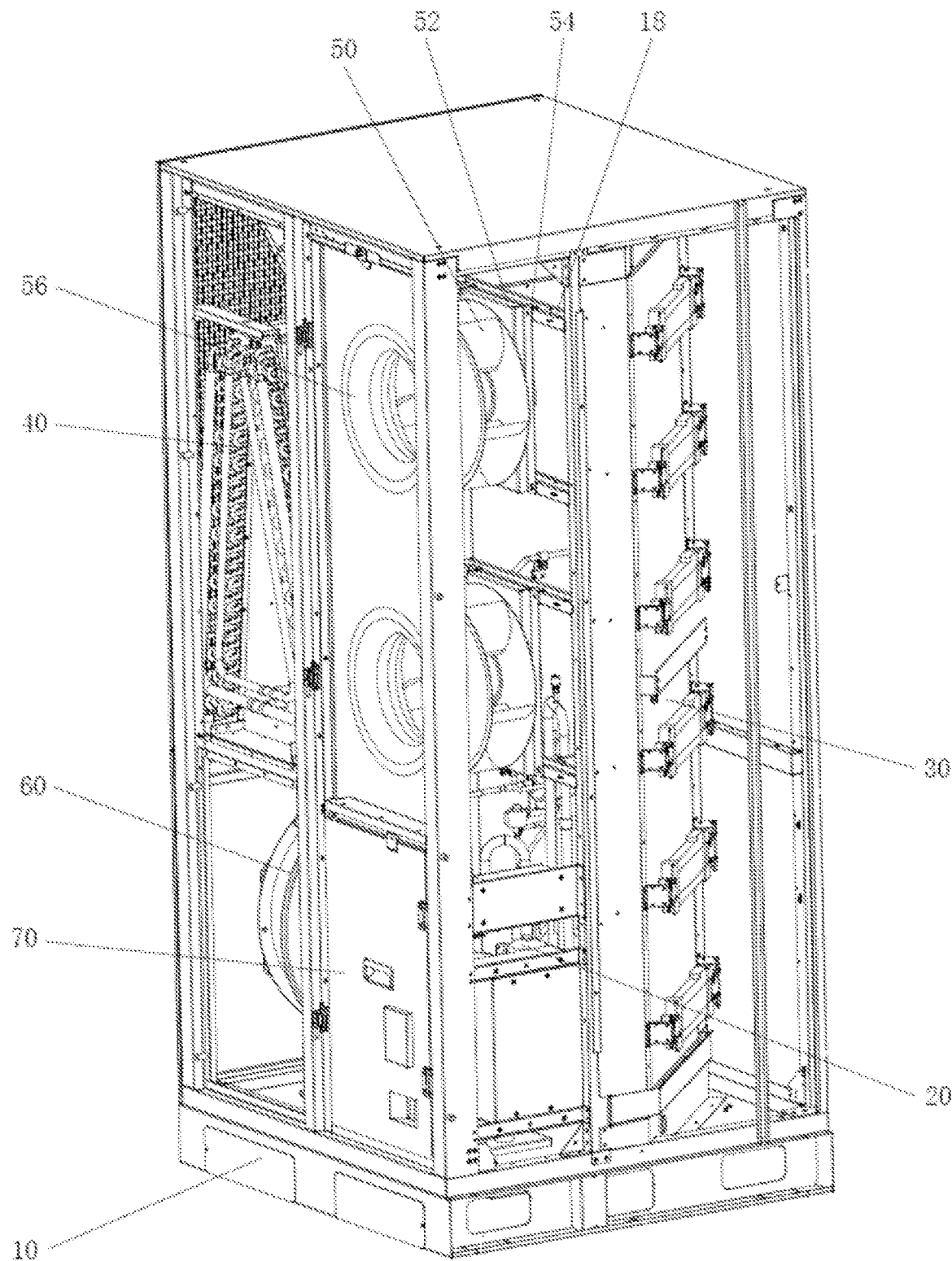
FIG. 3 is an internal structural view of the air-conditioning system shown in FIG. 2.
Figure 4:
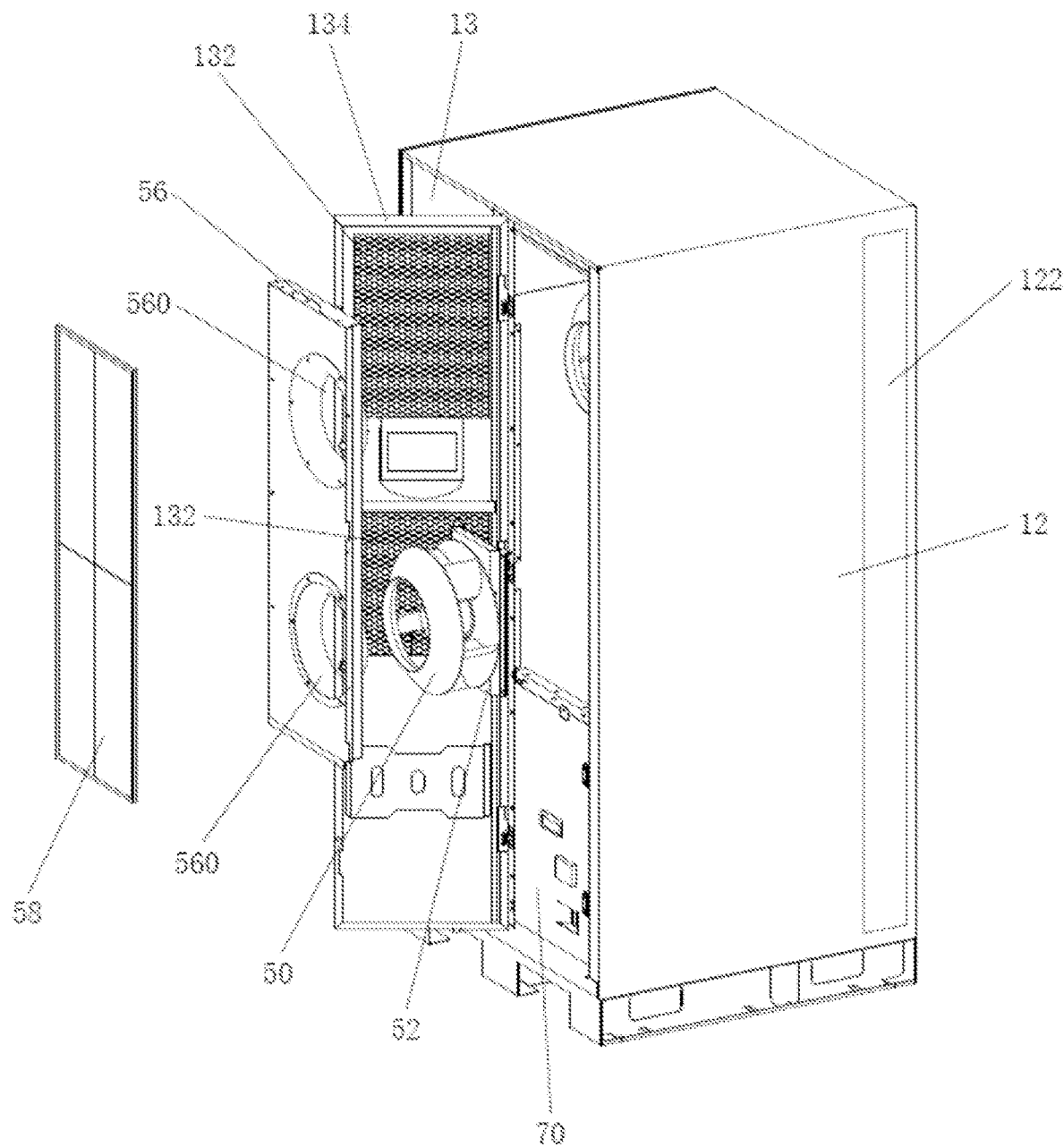
FIG. 4 is an exploded view of internal fans of the air-conditioning system shown in FIG. 1.

As shown in FIG. 3 and FIG. 4, an electrical control box 70 is disposed in the indoor compartment 16 of the cabinet 10. The electrical control box 70 is rotatably connected to a frame in the cabinet 10 through hinges, which facilitate later maintenance by users. The electrical control box 70 is located below the internal fans 50, is arranged abreast the compressor 20, is closer to the third side plate 13 than the compressor 20, and can prevent, to some extent, air in the indoor compartment 16 from leaking through the position where it is located. Preferably, an openable indoor compartment door 134 is disposed at a position, corresponding to the indoor compartment 16, of the third side plate 13, so that users can easily debug, clean and maintain components in the indoor compartment 16, such as the electrical control box 70 and the internal fans 50. A detachable outdoor compartment door 136 is disposed at a position, corresponding to the outdoor compartment 17, of the third side plate 13, so that users can easily clean and maintain components in the outdoor compartment 17, such as the external fan 60 and the condenser 40.

As shown in FIG. 3 and FIG. 4, beams 18 are disposed in the indoor compartment 16 of the cabinet 10, the internal fans 50 are fixed on internal fan stands 52, and hooks 54 are formed at the tops of the stands 52. When assembled, the stands 52 with the corresponding internal fans 50 fixed thereon are hung on the beams 18 first through the hooks 54, and then the stands 52 are fixedly connected to the beams 18 through screws. When the internal fans 50 are disassembled, the screws are removed, and then the stands 52 are slightly lifted to separate/free the hooks 54 from the beams 18. Thus, the stands 52 with the corresponding internal fans 50 fixed thereon are disassembled from the cabinet 10. In this way, the internal fans 50 are preassembled to the beams 18 through the hooks 54 in the assembling and disassembling process, so that users do not need to hold the internal fans 50 by hand when turning the screws. Thus, operation is easier and more convenient. In this embodiment, two internal fans 50 are arranged with one above the other, and each internal fan 50 is mounted in the cabinet 10 through one internal fan stand 52, and corresponding to each internal fan 50, the indoor compartment door 134 is provided with one internal air inlet 132. It should be noted that the number of the internal fans 50 may also be three, four or the like, and can be set as actually needed.

Preferably, a first air guide member 56 is disposed between the internal fans 50 and the indoor compartment door 134; and corresponding to each internal fan 50, the first air guide member 56 is provided with an air guide port 560 which is communicated with the internal fan 50 and the corresponding internal air inlet 132 and obtains a sealing effect on an air inlet side of the internal fan 50, so that indoor heated/hot air flows to the internal fans 50 along the air guide ports 560 after entering the indoor compartment 16 and will not be diffused in the indoor compartment 16 to mix with outdoor cool/cold air. Preferably, a filter screen 58 is disposed between the first air guide member 56 and the indoor compartment door 134 to filter out dust in the indoor heated/hot air entered the indoor compartment 16, so that components, especially the internal fans 50, in the indoor compartment 16 are prevented from being contaminated by dust, and more importantly, the quality of cooled/cold air finally discharged to the indoor space is improved. It should be understood that a filter screen 58 may be disposed at the internal air outlet 122 in the second side plate 12 to further filter the cooled/cold air discharged to the indoor space.

Preferably, the evaporator 30 is obliquely disposed in the indoor compartment 16, and an angle is formed between the evaporator 30 and the flow direction of air discharged by the internal fans 50. In the present embodiment as shown in FIG. 3, the internal fans 50 are axial-flow fans and the axial direction of the internal fans 50 is perpendicular to the third side plate 13, and air discharged by the axial-flow fans 50 flows toward the fourth side plate 14. Preferably, the evaporator 30 is inclined relative to the fourth side plate 14 and the second side plate 12. More preferably, angles formed between the evaporator 30 and the fourth side plate 14 and the second side plate 12 are about 45°. That is to say, the angle formed between the evaporator 30 and the airflow discharged from the internal fans 50 is about 45°, as shown in FIG. 7. The evaporator 30 is obliquely disposed in the indoor compartment 16, so that the evaporator 30 has a larger windward area and can sufficiently exchange heat with the air discharged by the internal fans 50, and the air discharged by the internal fans 50 can be turned by a certain angle when flowing through the evaporator 30. As shown in the FIG. 4, the internal air outlet 122 is located in an edge, close to the fourth side plate 14, of the second side plate 12, and the air discharged by the internal fans 50 is cooled and turned by about 90° when flowing through the evaporator 30, and is then discharged to the indoor space via the internal air outlet 122.

Figure 5:
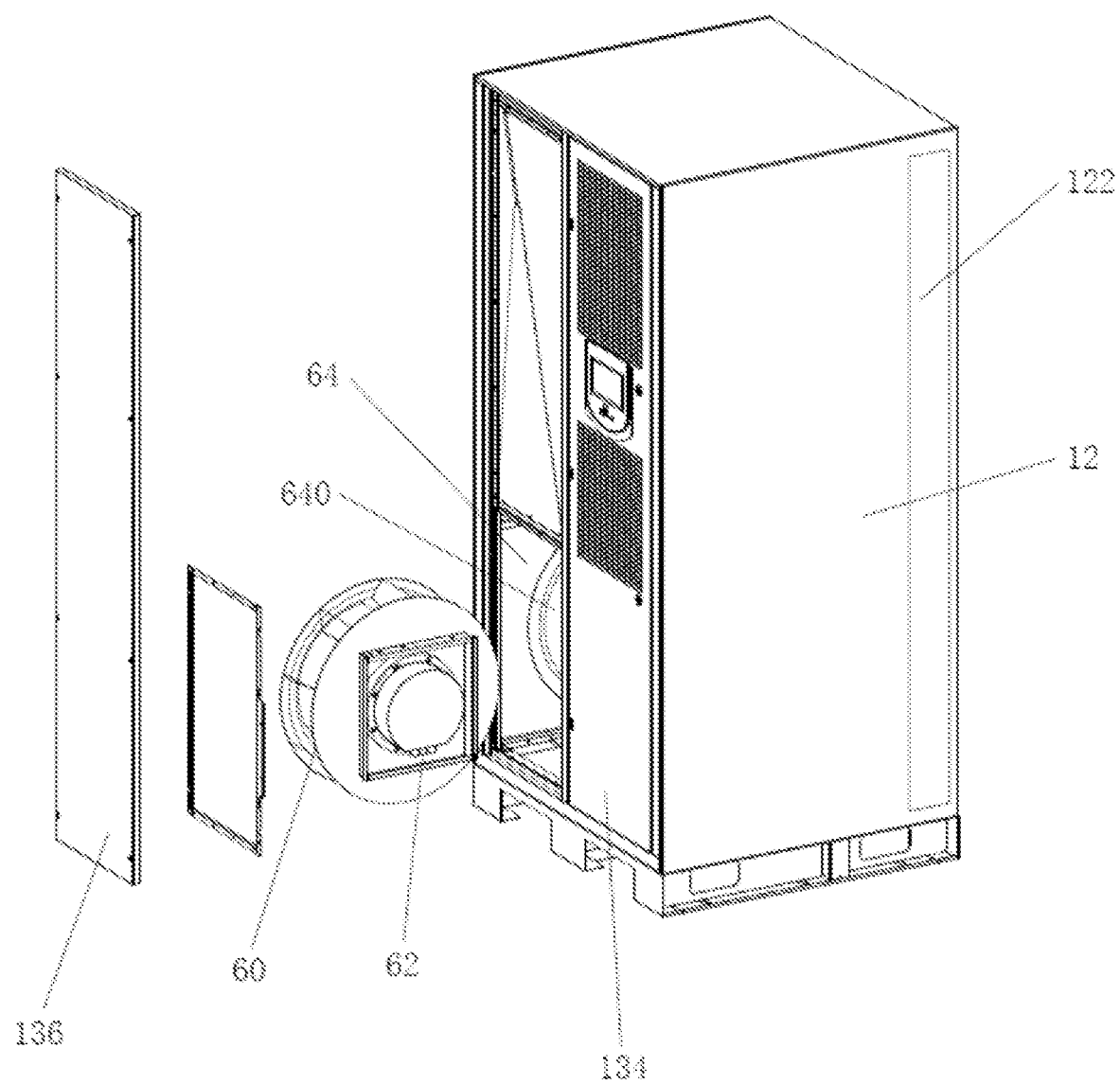
FIG. 5 is an exploded view of an external fan of the air-conditioning system shown in FIG. 1.

As shown in FIG. 5 and FIG. 6, a mounting bracket 19 is disposed in the outdoor compartment 17 of the cabinet 10, and the external fan 60 is slidably mounted to the mounting bracket 19 through an external fan stand 62. Preferably, a second air guide member 64 is disposed between the external fan 60 and the first side plate 11. The second air guide member 64 is provided with an air guide port 640 at a position corresponding to the external fan 60. The air guide port 640 is communicated with the external air inlet 114 and the external fan 60 and obtains a sealing effect on an air inlet side of the external fan 60, so that outdoor cool/cold air flows to the external fan 60 along the air guide port 640 after entering the outdoor compartment 17 and will not be diffused to mix with indoor heated/hot air in the outdoor compartment 17. When to be disassembled, the external fan 60 is pushed inwards to be staggered with the second air guide member 64, then the second air guide member 64 is removed from the first side plate 11, and finally, the external fan 60 can be pulled out from the outdoor compartment 17 of the cabinet 10. In some embodiments, filter screens may be disposed at the external air outlet 112 and the external air inlet 114 in the first side plate 11 to filter outdoor air.

In the present embodiment, the air-conditioning system is of a cabinet structure as the whole, has a small size and occupies a small space. The partition 15 is disposed in the cabinet 10 of the air-conditioning system, so that the air flow of the internal fans 50 is completely separated/isolated from the air flow of the external fan 60, internal circulating air and external circulating air are effectively prevented from being mixed, and the refrigerating effect is improved. In addition, the air compressor 20, the evaporator 30 and the condenser 40 of the air-conditioning system are rationally arranged according to the internal space of the cabinet 10, so that the overall structure is more compact. The internal/external air outlets are arranged according to the positions of the evaporator 30, the condenser 40, the internal fans 50 and the external fan 60, so that air discharged by the internal fans 50 and the external fan 60 can sufficiently exchange heat with the evaporator 30 and the condenser 40, and the refrigerating effect is further improved. In this embodiment, the cabinet 10 has a dimension of 2050×1000×900 mm and the system has a refrigerating effect of 30 KW. Moreover, the internal fans 50 and the external fan 60 are mounted in the cabinet 10 through the stands 52 and the stand 62 respectively, so that the internal fans 50 and the external fan 60 can be assembled and disassembled more conveniently and quickly, and can be easily maintained later.

Figure 9:
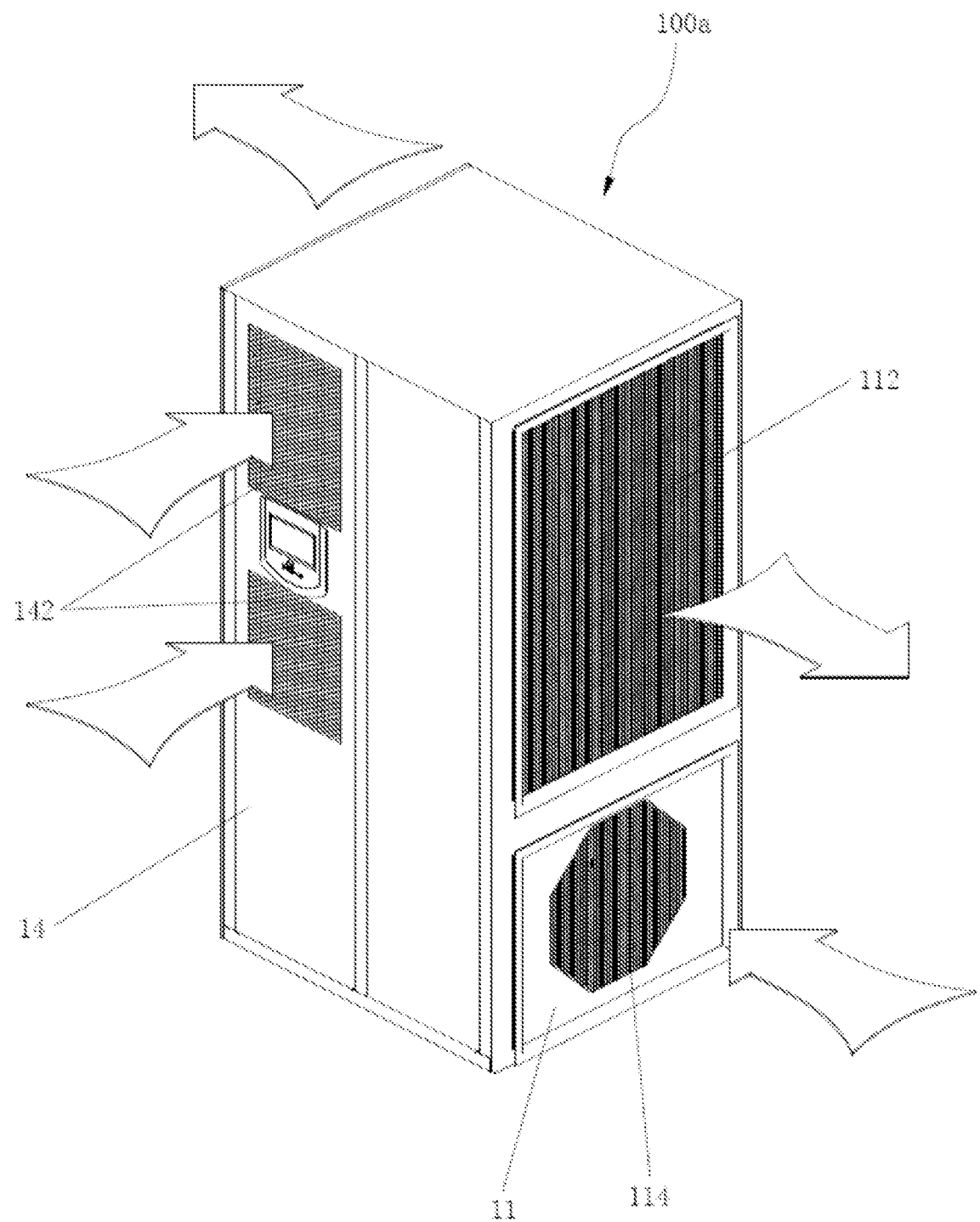
FIG. 9 is a structural view of an air-conditioning system according to another embodiment of the invention.

As shown in FIG. 9, in another embodiment of the present invention, the air-conditioning system 100a is bilaterally symmetrical in structure with the air-conditioning system 100 in the previous embodiment. Specifically, in this embodiment, internal air inlets 142 of the air-conditioning system 100a are formed in the fourth side plate 14, and the internal fans 50 and the compressor 20 in the indoor compartment 16 are arranged close to the fourth side plate 14; and the evaporator 30 is arranged close to the third side plate 13, and the internal air outlet 122 is located in an edge, close to the third side plate 13, of the second side plate 12. The air-conditioning system 100 shown in FIG. 1 is generally called a left-hand system, the air-conditioning system 100a shown in FIG. 8 is generally called a right-hand system, and the two systems 100 and 110a may be used separately or in pairs. When the two systems 100 and 100a are used in pairs, the two systems 100 and 100a are arranged left and right abreast, and the internal air inlets 132 of the two systems 100 and 100a face a left side and a right side of an indoor space respectively; the internal air outlets 122 of the two systems 100 and 100a orientate to the same direction, such as both orientate to the center of the indoor space; and the external air inlets 114 and the external air outlets 112 of the two systems 100 and 100a face an outdoor space.

Figure 10:
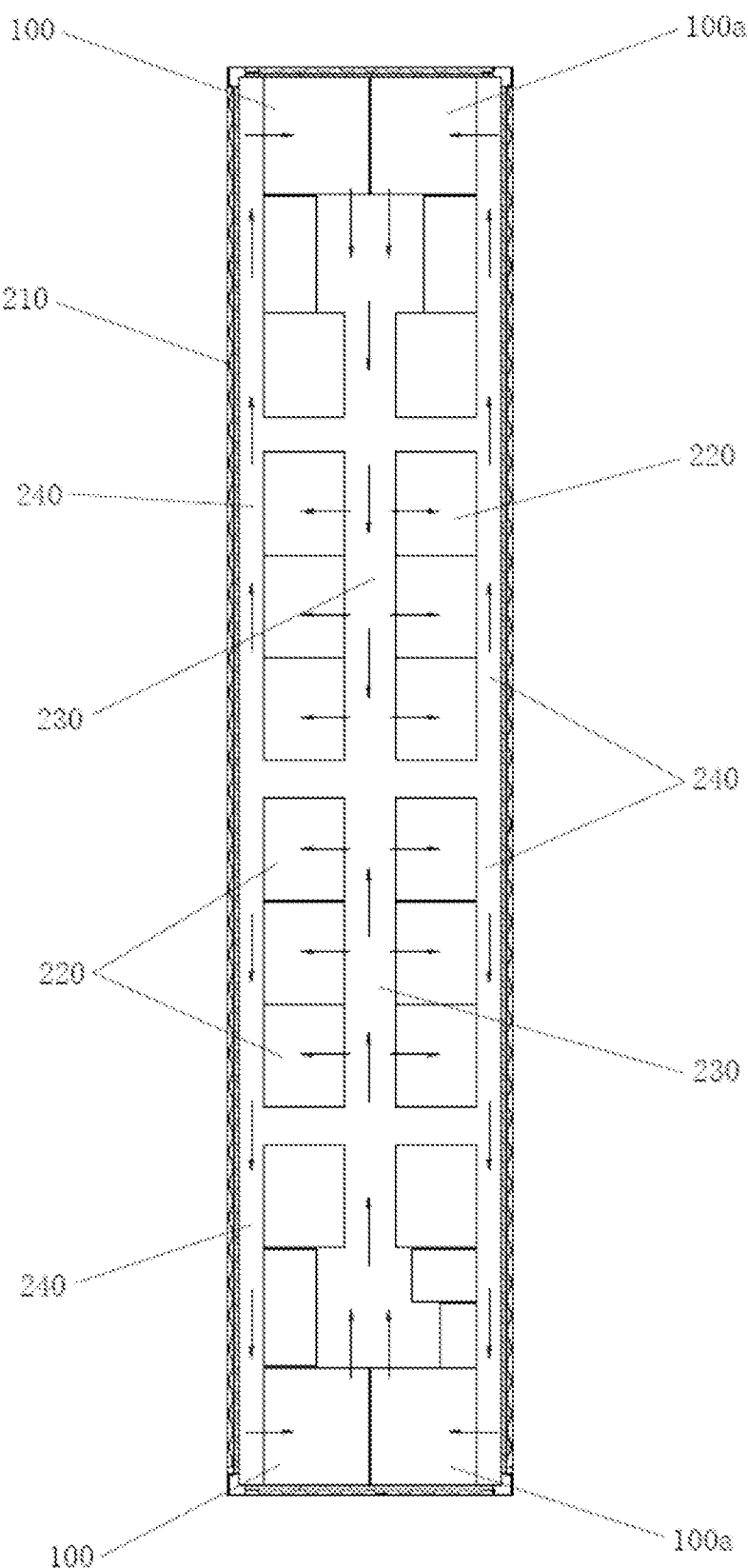
FIG. 10 is a schematic diagram of a container according to the invention.

As shown in FIG. 10 which illustrates a specific embodiment of a container using the air-conditioning systems provided by the invention. The container comprises a case 210 which defines a longitudinal/first direction and a transverse/second direction perpendicular to the longitudinal/second direction. The case 210 comprises a pair of spaced sidewalls extending along the longitudinal/first direction. Two rows of shelves 220 each row extending in the longitudinal/first direction are disposed in the case 210, and the air-conditioning systems 100 and 100a are disposed at opposite ends of the shelves 220 in the longitudinal/first direction. A large quantity of thermogenic goods, such as batteries, is stacked on the shelves 220. The two rows of shelves 220 are spaced apart from each other in the transverse/second direction, and a cold/first air passage 230 extending in the longitudinal/first direction is formed between the two rows of shelves 220; and each of the two rows of shelves 220 is spaced apart from the corresponding sidewall of the case 210, and a hot/second air passage 240 is formed between each of the two rows of shelves 220 and the side-wall of the case 210. The air-conditioning systems 100 and 100a are preferably a left-hand system and a right-hand system that are used in pairs, the internal air outlets 122 of the two systems 100 and 100a face the cold/first air passage 230, the internal air inlets 132 of the left-hand system 100 face one sidewall of the case 210 and are communicated with the hot/second air passage 240 on the left side of the case 210, and the internal air inlets 142 of the right-hand system 100a face the other sidewall of the case 210 and are communicated with the hot/second air passage 240 on the right side of the case 210; and the external air inlets 114 and the external air outlets 112 of the two systems 100 and 100a face and are communicated with an outdoor space outside the case 210 through an end of the case 210 in the first direction. The structures of the two air-conditioning systems 100 and 100a are symmetric about a middle line located therebetween.

In operation, cold/cooled air from the air-conditioning systems 100 and 100a flows along the cold/first air passage 230, passes through the shelves 220 on opposite sides of the cold/second air passage 230 and exchanges heat with the thermogenic goods on the shelves 220. Heated/hot air generated after the heat exchange flows back to the air-conditioning systems 100 and 100a along the hot/second air passages 240. When the heated/hot air flows through the evaporators 30 under the action of the internal fans 50 and exchanges heat with the evaporators 30, and cooled/cold air generated after the heat exchange is discharged to the indoor space again; meanwhile, heat is transferred by the refrigerant to the condensers 40, outdoor cool/cold air exchanges heat with the condensers 40 under the action of the external fans 60, and finally, the heat is discharged to the outdoor space outside the case 210. Preferably, under the condition that the case 210 is long enough, the air-conditioning systems 100 and 100a are disposed at each of the two ends of the case 210 to blow cooled/cold air to the center of the case 210, so that the situation that cooled/cold air cannot be distributed uniformly and even cannot be blown to some regions of the case 210 when the case 210 is too long is effectively avoided. Thus, the thermogenic goods on all the shelves 220 are sufficiently and effectively cooled.

It should be noted that the invention is not limited to the above implementations, and other transformations can be made by those skilled in the art according to the creative spirit of the invention. All these transformations made according to the creative spirit of the invention should fall within the protection scope of the invention.

What is claimed is:

1. An air-conditioning system, configured to be mounted in a container, the air-conditioning system comprising:
    a cabinet comprising an internal space, a partition disposed in the cabinet to divide the internal space into an indoor compartment and an outdoor compartment;
    an evaporator, a compressor and at least one internal fan disposed in the indoor compartment; and
    a condenser and an external fan disposed in the outdoor compartment, the evaporator, the compressor and the condenser cooperatively forming a refrigerant circulation loop;
    wherein the cabinet is provided with an internal air inlet at a position corresponding to the internal fan, an internal air outlet at a position corresponding to the evaporator, an external air inlet at a position corresponding to the external fan, and an external air outlet at a position corresponding to the condenser;
    the cabinet comprises a first side plate and a second side plate that are opposite to each other, and a third side plate and a fourth side plate that are opposite to each other;
    the partition is parallel to and spaced apart from the first side plate and the second side plate;
    the external air outlet is formed in the first side plate;
    the internal air inlet is formed in one of the third side plate and the fourth side plate; and
    the internal air outlet is located in an edge, close to another one of the third side plate and the fourth side plate, of the second side plate.

2. The air-conditioning system according to claim 1, wherein the external air outlet and the external air inlet are formed at a same side of the cabinet.

3. The air-conditioning system according to claim 2, wherein the external air outlet and the external air inlet are arranged one above the other in a vertical direction; and the condenser and the external fan are arranged one above the other in the vertical direction.

4. The air-conditioning system according to claim 3, wherein the external air outlet is located above the external air inlet and the condenser is located above the external fan.

5. The air-conditioning system according to claim 1, wherein the internal fan and the evaporator are arranged in the indoor compartment.

6. The air-conditioning system according to claim 5, wherein the compressor is located below the internal fan.

7. The air-conditioning system according to claim 6, wherein an electrical control box is disposed in the indoor compartment, the electrical control box is located below the internal fan, and the electrical control box and the compressor are arranged abreast.

8. The air-conditioning system according to claim 7, wherein the electrical control box is closer to a side plate, formed with the internal air inlet, of the cabinet than the compressor.

9. The air-conditioning system according to claim 1, wherein a first air guide member is disposed between the internal fan and a side plate, formed with the internal air inlet, of the cabinet, and is provided with an air guide port communicated with the internal air inlet and the internal fan.

10. The air-conditioning system according to claim 9, wherein a beam is disposed in the indoor compartment, and the internal fan is hung on the beam through a stand.

11. The air-conditioning system according to claim 9, wherein a filter screen is disposed between the first air guide member and the cabinet.

12. The air-conditioning system according to claim 1, wherein
    an angle is formed between the evaporator and the partition;
    the internal air inlet is formed in the third side plate; and
    the internal air outlet is located in the edge, close to the fourth side plate, of the second side plate.

13. The air-conditioning system according to claim 1, wherein
    an angle is formed between the evaporator and the partition;
    the internal air inlet is formed in the fourth side plate; and
    the internal air outlet is located in the edge, close to the third side plate, of the second side plate.

14. An air-conditioning system, configured to be mounted in a container, the air-conditioning system comprising:
    a cabinet comprising an internal space, a partition disposed in the cabinet to divide the internal space into an indoor compartment and an outdoor compartment;
    an evaporator, a compressor and at least one internal fan disposed in the indoor compartment; and
    a condenser and an external fan disposed in the outdoor compartment, the evaporator, the compressor and the condenser cooperatively forming a refrigerant circulation loop;
    wherein the cabinet is provided with an internal air inlet at a position corresponding to the internal fan, an internal air outlet at a position corresponding to the evaporator, an external air inlet at a position corresponding to the external fan, and an external air outlet at a position corresponding to the condenser;
    wherein a first air guide member is disposed between the internal fan and a side plate, formed with the internal air inlet, of the cabinet, and is provided with an air guide port communicated with the internal air inlet and the internal fan; and
    wherein a second air guide member is disposed between the external fan and another side plate, formed with the external air inlet, of the cabinet, and is provided with an air guide port communicated with the external air outlet and the external fan.

15. The air-conditioning system according to claim 14, wherein a mounting bracket is disposed in the outdoor compartment, and the external fan is slidably mounted to the mounting bracket through a stand.

16. The air-conditioning system according to claim 14, wherein a filter screen is disposed between the second air guide member and the cabinet.

17. A container, comprising:
a case defining a first direction and a second direction inclined to the first direction;
two rows of shelves disposed within the case and spaced from each other in the second direction; and
at least two air-conditioning systems each of which comprises:
a cabinet comprising an internal space a partition disposed in the cabinet to divide the internal space into an indoor compartment and an outdoor compartment;
an evaporator, a compressor and at least one internal fan disposed in the indoor compartment; and
a condenser and an external fan disposed in the outdoor compartment, the evaporator, the compressor and the condenser cooperatively forming a refrigerant circulation loop;
wherein the cabinet is provided with an internal air inlet at a position corresponding to the internal fan, an internal air outlet at a position corresponding to the evaporator, an external air inlet at a position corresponding to the external fan, and an external air outlet at a position corresponding to the condenser; and
wherein the two air-conditioning system are located at a same end of the container in the first direction, a first air passage extending along the first direction is formed between the two rows of shelves, second air passages are formed between the two rows of shelves and the case, the first air passage is communicated with the internal air outlets of the two air-conditioning systems so that cooled air discharged from the air-conditioning systems is capable of flowing into the first air passage, and the second air passages are communicated with the internal air inlets of the two air-conditioning systems so that heated air is capable of flowing back to the air-conditioning systems along the second air passages.

18. The container according to claim 17, wherein the cooled air discharged from the air-conditioning systems is capable of flowing through the shelves in the second direction from the first air passage for exchanging heat with thermogenic goods disposed on the shelves to be turned into the heated air;
the heated air is capable of flowing back to the air-conditioning systems along the second air passages under action of the internal fans and exchanging heat with the evaporators; and
outdoor air located outside the case is capable of entering into the outdoor compartment under action of the external fans and exchanging heat with the condensers.

19. The container according to claim 17, wherein
the case comprises two sidewalls extending in the first direction;
the second air passages are formed between the two rows of shelves and the two sidewalls of the case respectively;
the internal air inlets of the two air-conditioning systems are orientated to the second air passages respectively;
the internal air outlets of the two air-conditioning systems are orientated to the first air passage; and
the external air inlets and the external air outlets of the two air-conditioning systems face an outdoor space outside the case in the first direction.

20. The container according to claim 19, wherein structures of the two air-conditioning systems are symmetric about a middle line located therebetween.

* * * * *